(12) United States Patent
Enomoto

(10) Patent No.: US 11,774,666 B2
(45) Date of Patent: Oct. 3, 2023

(54) LIGHT-EMITTING DEVICE AND LIGHT-EMITTING MODULE

(71) Applicant: NICHIA CORPORATION, Anan (JP)

(72) Inventor: Kiyoshi Enomoto, Komatsushima (JP)

(73) Assignee: NICHIA CORPORATION, Anan (JP)

( * ) Notice: Subject to any disclaimer, the term of this patent is extended or adjusted under 35 U.S.C. 154(b) by 10 days.

(21) Appl. No.: 17/961,405

(22) Filed: Oct. 6, 2022

(65) Prior Publication Data

US 2023/0116157 A1 Apr. 13, 2023

(30) Foreign Application Priority Data

Oct. 13, 2021 (JP) ................... 2021-168367

(51) Int. Cl.
*F21V 8/00* (2006.01)

(52) U.S. Cl.
CPC ............ *G02B 6/0066* (2013.01); *G02B 6/0031* (2013.01); *G02B 6/0046* (2013.01); *G02B 6/009* (2013.01)

(58) Field of Classification Search
CPC ... G02B 6/0066; G02B 6/0031; G02B 6/0046; G02B 6/009
See application file for complete search history.

(56) References Cited

U.S. PATENT DOCUMENTS

| 9,748,733 | B2* | 8/2017 | Okahisa | ............. | H01S 5/02255 |
| 2005/0063435 | A1 | 3/2005 | Imai et al. | | |
| 2006/0126690 | A1 | 6/2006 | Kido et al. | | |
| 2010/0158060 | A1* | 6/2010 | Faybishenko | ....... | G02B 6/4206 372/98 |
| 2011/0103056 | A1 | 5/2011 | Wolak et al. | | |
| 2016/0147025 | A1 | 5/2016 | Sakamoto | | |
| 2020/0083664 | A1* | 3/2020 | Miura et al. | ......... | H01S 5/4075 |

FOREIGN PATENT DOCUMENTS

| JP | 2004096092 | A | 3/2004 |
| JP | 2006171348 | A | 6/2006 |
| JP | 2011520292 | A | 7/2011 |
| JP | 2015031739 | A | 2/2015 |

\* cited by examiner

*Primary Examiner* — Donald L Raleigh
(74) *Attorney, Agent, or Firm* — Foley & Lardner LLP

(57) ABSTRACT

A light-emitting device includes: a base portion; a plurality of light-emitting elements disposed on an upper surface of the base portion, the plurality of light-emitting elements including: a first light-emitting element configured to emit first light from a first emitting surface, and a second light-emitting element configured to emit second light from a second emitting surface; and one or more reflective members disposed on the upper surface of the base portion and configured to reflect upward the first light and the second light. The one or more reflective members include: a first reflective surface configured to reflect the first light, a second reflective surface configured to reflect upward the first light that has been reflected at the first reflective surface, and a third reflective surface configured to reflect the second light.

15 Claims, 12 Drawing Sheets

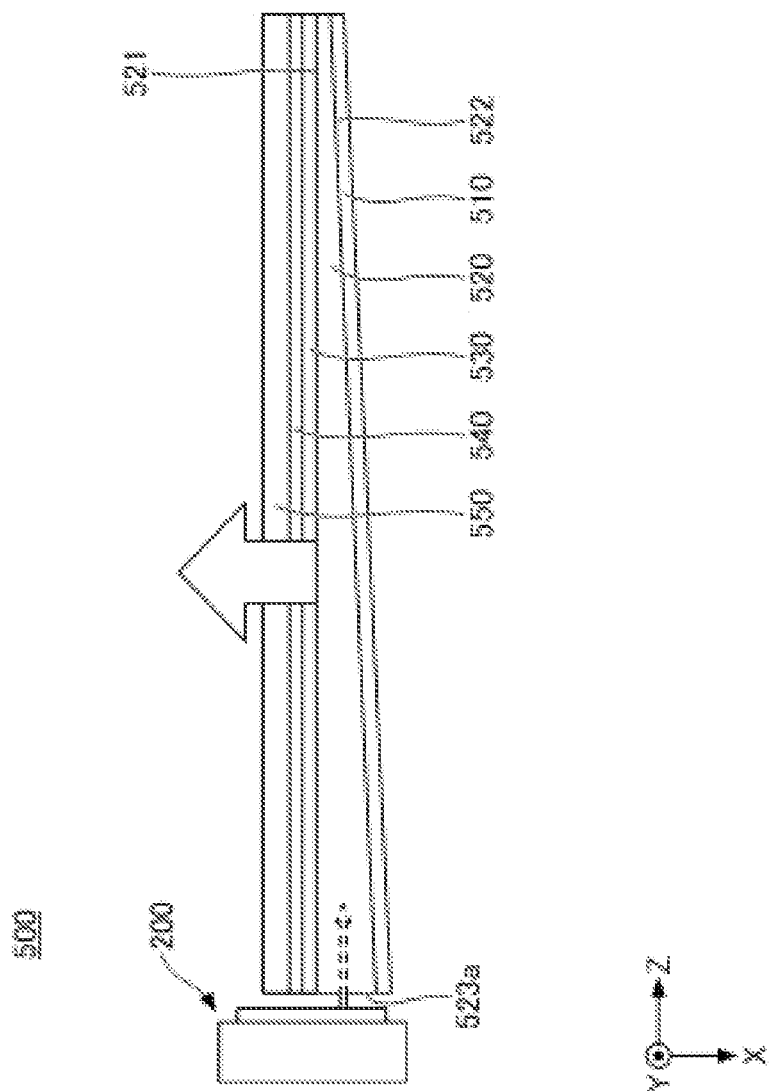

LIGHT-EMITTING DEVICE AND LIGHT-EMITTING MODULE

CROSS-REFERENCE TO RELATED APPLICATION

This application claims priority to Japanese Patent Application No. 2021-168367, filed on Oct. 13, 2021, the disclosure of which is hereby incorporated by reference in its entirety.

BACKGROUND

The present disclosure relates to a light-emitting device and a light-emitting module.

In Japanese Patent Publication No. 2015-031739, an LD module is described that includes a plurality of laser diodes and a plurality of mirrors disposed on an upper surface of a substrate. In this LD module, after light emitted from each laser diode is collimated by a collimating lens, the light is reflected twice by mirrors and directed in a direction parallel with the upper surface of the substrate, and enters an optical fiber.

SUMMARY

In the LD module of Japanese Patent Publication No. 2015-031739, the mirrors are disposed offset from one another to ensure that interference between laser beams does not occur.

An object of the present disclosure is to provide a light-emitting device that can be reduced in size. Another object of the present disclosure is to provide a light-emitting module including this light-emitting device.

A light-emitting device according to an embodiment of the present disclosure includes a base portion; a plurality of light-emitting elements disposed on an upper surface of the base portion, and one or more reflective members. The plurality of light-emitting elements include a first light-emitting element that emits a first light from a first emitting surface; and a second light-emitting element that emits a second light from a second emitting surface. The one or more reflective members are disposed on the upper surface of the base portion and reflect upward the first light and the second light. The one or more reflective members include a first reflective surface that reflects the first light, a second reflective surface that reflects upward the first light reflected at the first reflective surface, and a third reflective surface that reflects the second light. The first light that is emitted from the first emitting surface and advances toward the first reflective surface includes light that advances in a first direction parallel with the upper surface of the base portion. The first light that is reflected at the first reflective surface and advances toward the second reflective surface includes light that advances in a second direction parallel with the upper surface of the base portion and perpendicular to the first direction.

Also, a light-emitting module according to an embodiment of the present disclosure includes the light-emitting device according to an embodiment of the present disclosure; and a light guide plate disposed above the light-emitting device, wherein light emitted from the light-emitting device is emitted to the light guide plate.

According to an embodiment of the present disclosure, a light-emitting device that can be reduced in size can be provided. Also, a light-emitting module provided with the light-emitting device can be provided.

BRIEF DESCRIPTION OF THE DRAWINGS

FIG. 12 is a schematic lateral side view (2) illustrating the light-emitting module provided with the light-emitting device.

DETAILED DESCRIPTION

Figure 1:
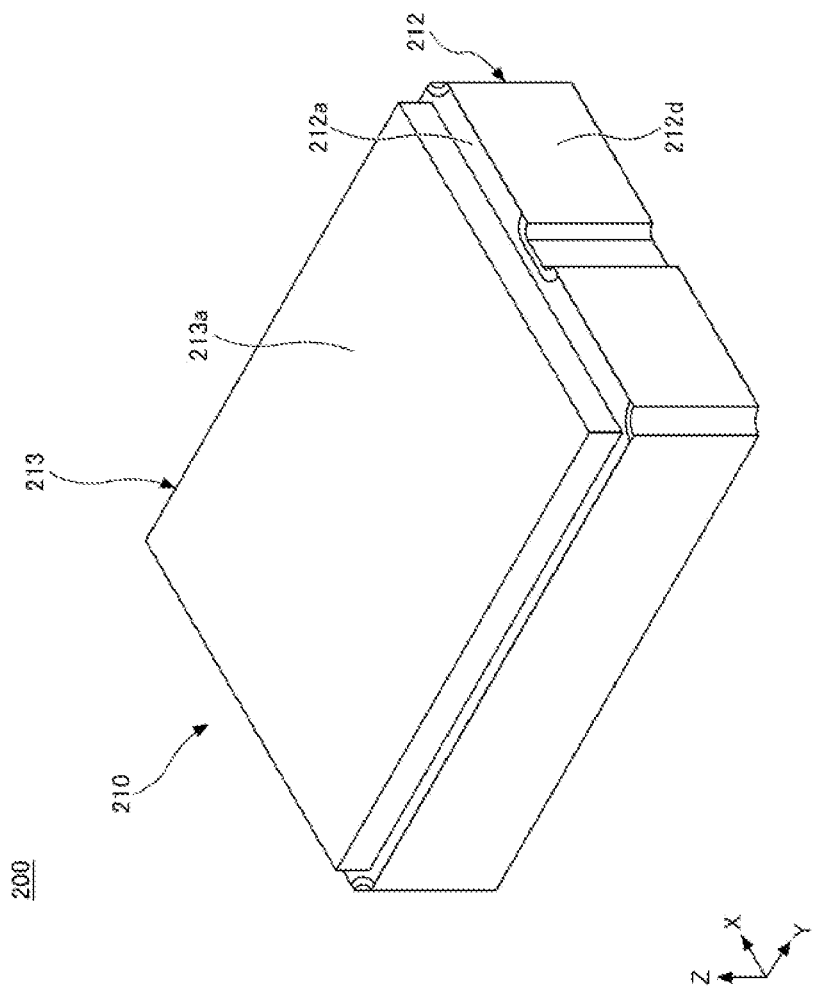
FIG. 1 is a schematic perspective view illustrating a light-emitting device according to the present embodiment.

Hereinafter, embodiments for carrying out the invention will be described with reference to the drawings. Note that, in the following description, terms indicating a specific direction or position (e.g., "upper", "lower", and other terms including those terms) are used as necessary. The use of those terms, however, is to facilitate understanding of the invention with reference to the drawings, and the technical scope of the present invention is not limited by the meaning of those terms. In addition, parts having the same reference numerals appearing in a plurality of drawings indicate identical or equivalent parts or members.

In the present disclosure, polygons, such as triangles and quadrangles, having shapes in which the corners of the polygon are rounded, chamfered, beveled, coved, and the like, are referred to as polygons. Furthermore, a shape obtained by processing not only the corners (ends of sides), but also an intermediate portion of a side is similarly referred to as a polygon. In other words, a shape that is partially processed while leaving the polygon as the base is included in the interpretation of the "polygon" described in the present disclosure.

The same applies not only to polygons but also to words representing specific shapes such as trapezoids, circles, protrusions, and recessions. Furthermore, the same applies when dealing with each side forming that shape. In other words, even when processing is performed on a corner or an intermediate portion of a certain side, the interpretation of "side" includes the processed portion. Note that when a "polygon" or a "side" not partially processed is to be distinguished from a processed shape, a term such as "in a strict sense" will be added to the description as in, for example, "quadrangle in a strict sense".

Furthermore, the following embodiments exemplify light-emitting devices and the like for embodying the technical concepts of the present invention, but the present invention is not limited to the embodiments described below. In addition, unless otherwise specified, the dimensions, materials, shapes, relative arrangements, and the like of constituent elements described below are not intended to limit the scope of the present invention to those alone, but are intended to be exemplified. The contents described in one embodiment can be applied to other embodiments and modified examples. The size, positional relationship, and the like of the members illustrated in the drawings may be exaggerated in order to clarify the explanation. Furthermore, in order to avoid excessive complication of the drawings, a schematic view in which some elements are not illustrated may be used, or an end view illustrating only a cut surface may be used as a cross-sectional view.

Light-emitting Device

The light-emitting device according to the present embodiment is provided with at least a base portion, a plurality of light-emitting elements disposed on the upper surface of the base portion, and one or more reflective members disposed on the upper surface of the base portion. The plurality of light-emitting elements include at least a first light-emitting element and a second light-emitting element. Additionally, the one or more reflective members include a first reflective surface that reflects a first light emitted by the first light-emitting element, a second reflective surface that reflects upward the first light reflected at the first reflective surface, and a third reflective surface that reflects a second light emitted by the second light-emitting element.

Figure 2:
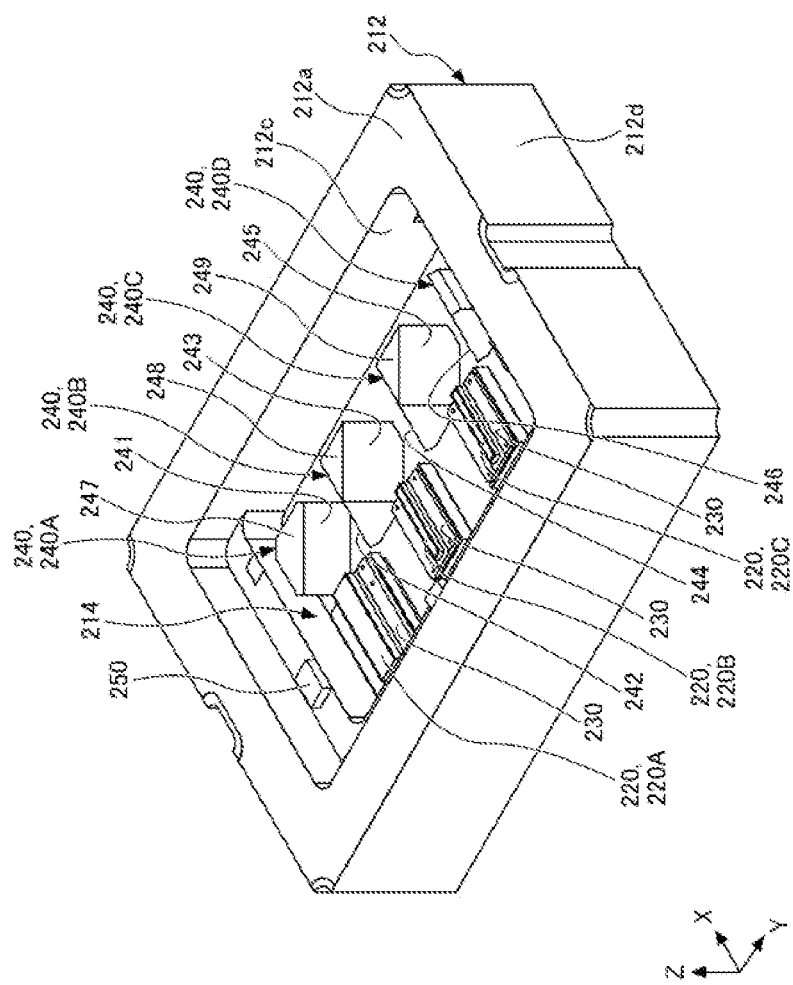
FIG. 2 is a schematic perspective view of the light-emitting device according to the present embodiment with a lid member removed.
Figure 3:
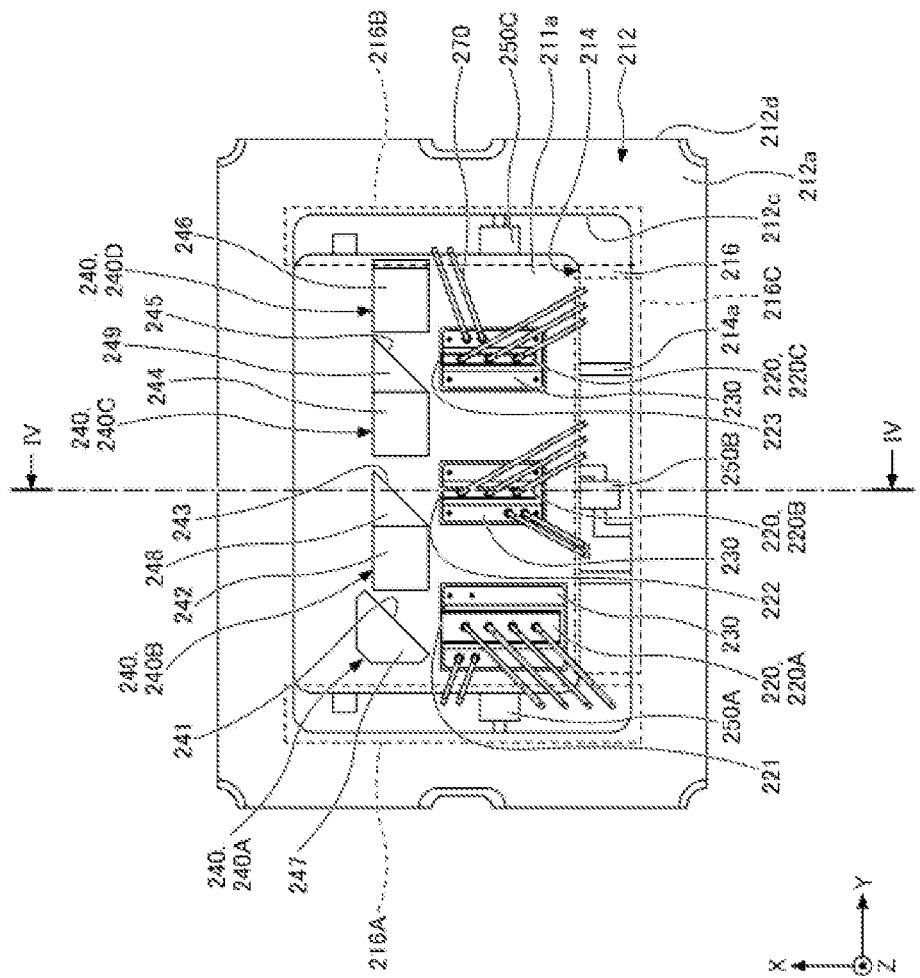
FIG. 3 is a schematic top view of the light-emitting device according to the present embodiment with the lid member removed.
Figure 4:
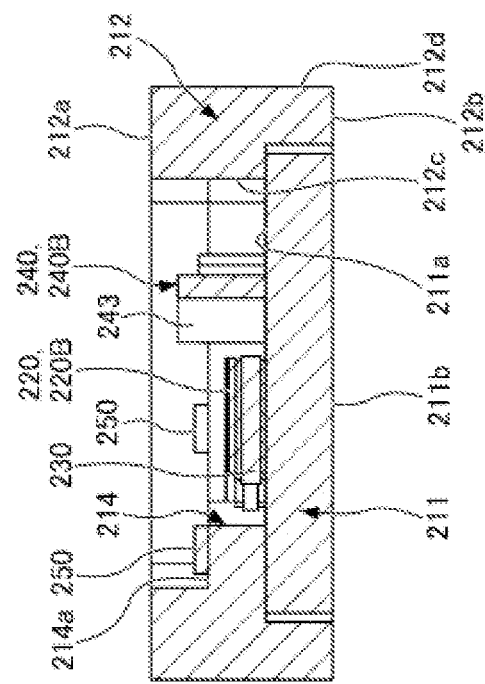
FIG. 4 is a schematic cross-sectional view taken along line IV-IV in FIG. 3 illustrating the light-emitting device according to the present embodiment.

A light-emitting device according to the present embodiment will be described below with reference to FIGS. 1 to 4. FIG. 1 is a schematic perspective view illustrating a light-emitting device according to the present embodiment. FIG. 2 is a schematic perspective view of the light-emitting device according to the present embodiment with a lid member removed. FIG. 3 is a schematic top view of the light-emitting device according to the present embodiment with the lid member removed. FIG. 4 is a schematic cross-sectional view taken along line IV-IV in FIG. 3 illustrating the light-emitting device according to the present embodiment. Note that in FIGS. 2 and 4, a wiring 270 illustrated in FIG. 3 is omitted.

An illustrated light-emitting device 200 is an example of the light-emitting device according to the present embodiment. The light-emitting device 200 includes a package 210 including a base portion 211, a frame portion 212, and a lid member 213; a plurality of light-emitting elements 220; one or more submounts 230 that support the plurality of light-emitting elements 220; one or more reflective members 240; a protecting element 250; and the wiring 270.

Each of the components of the light-emitting device 200 will now be described.

Package 210

The base portion 211 includes an upper surface 211a and a lower surface 211b. The base portion 211 has rectangular external shape in a top view, for example.

The frame portion 212 includes an upper surface 212a, a lower surface 212b, one or more inner lateral surfaces 212c, and one or more outer surfaces 212d. The frame portion 212 has a rectangular frame-like shape in a top view, for example. The one or more inner lateral surfaces 212c of the frame portion 212 includes the inner lateral surface(s) 212c that meet the upper surface 211a of the base portion 211. The one or more inner lateral surfaces 212c of the frame portion 212 surround at least a portion of the upper surface 211a of the base portion 211 and extend upward further than the upper surface 211a. The lower surface 212b of the frame portion 212 is located on roughly the same plane as the lower surface 211b of the base portion 211, for example.

Note that in FIGS. 1 to 4, the direction indicated by arrow X is defined as a first direction, the direction indicated by arrow Y is defined as a second direction, and the direction indicated by arrow Z is defined as a third direction. The second direction Y is perpendicular to the first direction X. The third direction Z is perpendicular to the first direction X and the second direction Y. The first direction X and the second direction Y are parallel with the upper surface 211a of the base portion 211, and the third direction Z is perpendicular to the upper surface 211a of the base portion 211. The first direction X and the second direction Y are, for example, parallel or perpendicular to any of the inner lateral surfaces 212c of the frame portion 212 in a top view. The same applies to other diagrams described below.

The base portion 211 and the frame portion 212 form a recessed shape recessed from the upper surface 212a of the frame portion 212 in the direction perpendicular to the upper surface 211a of the base portion 211. The recessed shape is formed on the inner side of the external shape of the frame portion 212 in a top view. In a top view, the upper surface 211a of the base portion 211 is surrounded by a frame formed by the one or more inner lateral surfaces 212c of the frame portion 212. The base portion 211 and the frame portion 212 may be integrally formed. The base portion 211 and the frame portion 212 may also be separately formed and then joined together. Note that top view here refers to a view of an object from a direction perpendicular to the upper surface 211a of the base portion 211.

The frame portion 212 may include one or more stepped portions 214 connected along at least one of two opposite sides in a top view. In the illustrated example, in a top view, out of the four sides where the upper surface 212a and the inner lateral surfaces 212c of the frame portion 212 are connected, the stepped portions 214 are provided along one of the pairs of opposite sides and along one side connecting these two opposite sides. The stepped portion 214 is not provided on the other side that connects the two sides. However, in a top view, the stepped portions 214 may be provided along all four sides that connect the upper surface 212a and the inner lateral surfaces 212c of the frame portion 212 or may be provided along only one pair of opposite sides. The stepped portion 214, for example, includes only an upper surface 214a and a lateral surface that meets with the upper surface 214a and extends downward.

The upper surface 214a of the stepped portion 214 is located at a position higher than the upper surface 211a of the base portion 211 and at a position lower than the upper surface 212a of the frame portion 212. The one or more inner lateral surfaces 212c of the frame portion 212 include (i) the lateral surfaces that meet with the upper surface 212a of the frame portion 212, and (ii) the lateral surfaces of the stepped portions 214.

In a top view, two of the stepped portions 214 may include a wiring regions 216 in the upper surfaces 214a across the two sides extending in the first direction X which are facing each other across the plurality of light-emitting elements. In the illustrated example, one of the stepped portions 214 includes a wiring region 216 in the upper surface 214a along one of the sides extending in the second direction Y.

For example, one or more metal films are provided in each wiring region 216. Also, the one or more metal films may be provided in the upper surface 212a and the lower surface 212b of the frame portion 212. In addition, the one or more metal films provided in the upper surface 214a of the stepped portions 214 may include a metal film electrically connected to the metal film provided in the lower surface 212b. However, the one or more metal films provided in the upper surface 214a of the stepped portions 214 may include a metal film electrically connected to the metal film provided in the upper surface 212a. For the metal film, Ni/Au (metal film stacked in order of Ni, Au), Ti/Pt/Au (metal film stacked in order of Ti, Pt, Au), and the like can be used, for example.

The lid member 213 includes an upper surface 213a, a lower surface, and one or more lateral surfaces that meet the upper surface 213a and the lower surface. The one or more lateral surfaces connect the outer edge of the upper surface 213a and the outer edge of the lower surface. The lid member 213 is, for example, a rectangular parallelepiped or a cube.

Note that the lid member 213 is not limited to a rectangular parallelepiped or a cube. In other words, the lid member 213 is not limited to having a rectangular shape in a top view and can have any shape, such as a circle, an ellipse, a polygon, or the like.

The lid member 213 is supported by the frame portion 212 and is disposed above the upper surface 211a of the base portion 211. The outer peripheral portion of the lower surface of the lid member 213 is joined to the upper surface 212a of the frame portion 212, for example. By joining the lid member 213 to the frame portion 212, a closed space is formed inside of the package 210.

For example, the base portion 211 can be formed using metal as the main material, and the frame portion 212 can be formed using ceramic as the main material. Examples of a metal for forming the base portion 211 include copper and the like. Also, for the ceramic for forming the frame portion 212, aluminum nitride, silicon nitride, aluminum oxide, or silicon carbide can be used. Note that the main material for forming the base portion 211 and the frame portion 212 is not limited thereto, and the base portion 211 may be formed using a ceramic or the frame portion 212 may be formed using a metal. The base portion 211 and the frame portion 212 may both be formed from a ceramic or may both be formed from a metal. The base portion 211 and the frame portion 212 are not limited to be formed using metal or ceramic as the main material and may be formed using a different main material with insulating properties.

The lid member 213 includes at least one light-transmitting portion that transmits light of a predetermined wavelength. The lid member 213, for example, can be formed using sapphire, quartz, silicon carbide, glass, or other light-transmissive material as a main material. Additionally, in the illustrated example, the lid member 213 is provided with a metal film at the join surface with the upper surface 212a of the frame portion 212. Also, the lid member 213 may be provided with a metal film so that only a portion includes a light-transmitting portion.

Light-emitting Element 220

The light-emitting element 220 is a semiconductor laser element, for example. The light-emitting element 220 is not limited to a semiconductor laser element, and may be, for example, a light-emitting diode (LED) or an organic light-emitting diode (OLED).

The light-emitting element 220 has, for example, a rectangular external shape in a top view. A lateral surface intersecting one of two short sides of the rectangle is an emitting surface for light emitted from the light-emitting element 220. The upper surface and the lower surface of the light-emitting element 220 each have a larger area than the emitting surface.

Here, a case in which the light-emitting element 220 is a semiconductor laser element will be described. Note that the light (laser beam) emitted from the light-emitting element 220 spreads and forms an elliptical far field pattern (hereinafter referred to as "FFP") on a plane parallel to the emitting surface. Here, the FFP indicates a shape and a light intensity distribution of the emitted light at a position remote from the emitting surface.

Based on the light of elliptical shape emitted from the light-emitting element 220, a direction along the major axis of the elliptical shape is referred to as a fast axis direction of the FFP, and a direction along the minor axis of the elliptical shape is referred to as a slow axis direction of the FFP. The fast axis direction of the FFP in the light-emitting element 220 may coincide with a layering direction in which a plurality of semiconductor layers including an active layer of the light-emitting element 220 is layered.

Based on the light intensity distribution of the FFP of the light-emitting element 220, light having an intensity of $1/e^2$ times or greater of a peak intensity value is referred to as a main portion of light. In this light intensity distribution, an angle corresponding to the intensity of $1/e^2$ is referred to as a spread angle. The spread angle of the FFP in the fast axis direction is greater than the spread angle of the FFP in the slow axis direction.

Also, light passing through the center of the elliptical shape of the FFP, in other words, light having a peak intensity in the light intensity distribution of the FFP is referred to as light advancing on an optical axis or light passing through an optical axis. Also, the optical path of the light advancing on the center of the FFP is referred to as the optical axis of the light.

As the light-emitting element 220, for example, a semiconductor laser element that emits blue light, a semiconductor laser element that emits green light, a semiconductor laser element that emits red light, or the like can be employed. A semiconductor laser element that emits light other than blue, green, and red light may also be employed.

Blue light refers to light having an emission peak wavelength within a range from 420 nm to 494 nm. Green light refers to light having the emission peak wavelength within a range from 495 nm to 570 nm. Red light refers to light having the emission peak wavelength within a range from 605 nm to 750 nm.

Examples of the semiconductor laser element that emits blue light or the semiconductor laser element that emits green light include a semiconductor laser element including a nitride semiconductor. GaN, InGaN, and AlGaN, for example, can be used as the nitride semiconductor. Examples of the semiconductor laser element that emits red light include a semiconductor laser element including an InAlGaP-based, GaInP-based, GaAs-based, or AlGaAs-based semiconductor.

Submount 230

The submount 230 has, for example, a rectangular parallelepiped shape and has a lower surface, an upper surface, and one or more lateral surfaces. Additionally, the submount 230 has a width in the up-and-down direction (third direction Z) smaller than the width in the front-and-back direction (first direction X) and the width in the left-and-right direction (second direction Y). Note that the shape of the submounts 230 need not necessarily be the cuboid shape. The submount 230 is formed using, for example, aluminum nitride or silicon carbide, although other materials may be used. A metal film is provided on the upper surface of the submount 230, for example.

Reflective Member 240

The reflective member 240 includes one or more reflective surfaces. A plurality of reflective surfaces are provided by the one or more reflective members 240. In the example illustrated in FIGS. 1 to 4, the light-emitting device 200 includes a plurality of reflective members 240. The plurality of reflective members 240 include a first reflective member 240A, a second reflective member 240B, a third reflective member 240C, and a fourth reflective member 240D.

The first reflective member 240A to the fourth reflective member 240D will be described below. Note that a plurality of or all of the first reflective member 240A to the fourth reflective member 240D may be integrally formed to implement a single reflective member 240. Accordingly, the description of each of the reflective members 240 of the first reflective member 240A to the fourth reflective member 240D also applies to the one or more reflective members 240. That is, for example, the advantages of the first reflective member 240A may also be the advantages of the one or more reflective members 240.

In the following description relating to the first reflective member 240A, the second reflective member 240B, the third reflective member 240C, and the fourth reflective member 240D, parallel and perpendicular include in their meanings a tolerance of ±5 degrees. Furthermore, when specific angles such as inclination angles are described, a tolerance of ±5 degrees from the specific angle is allowed in consideration of manufacturing accuracy.

The first reflective member 240A is provided with an upper surface 247, a lower surface, and a plurality of lateral surfaces that meet the upper surface 247 and the lower surface. In the light-emitting device 200 illustrated, the upper surface 247, the lower surface, and the plurality of lateral surfaces are flat surfaces. The upper surface 247 and the lower surface are parallel with each other. The lower surface has the same area as the upper surface 247. However, the positional relationship and the area size relationship between the upper surface 247 and the lower surface are not limited thereto.

The plurality of lateral surfaces include a first reflective surface 241 that reflects incident light. The plurality of lateral surfaces may include lateral surfaces non-parallel to each other. In the illustrated light-emitting device 200, the upper surface 247 is roughly a right angle triangle, and the first reflective surface 241 is a rectangle. The upper surface 247 may be an isosceles right triangle. The first reflective surface 241 is perpendicular to the lower surface and meets the long side of the upper surface 247.

Note that the upper surface 247, the lower surface, and the plurality of lateral surfaces may be curved surfaces or may be a mixture of flat surfaces and curved surfaces. Furthermore, the upper surface 247 may be a non-triangular shape such as a polygon with four or more sides, a semi-circle, or the like, for example. Also, the first reflective surface 241 may have a non-rectangular shape as long as it can reflect incident light in the desired direction.

The second reflective member 240B is provided with an upper surface 248, a lower surface, and a plurality of lateral surfaces that meet the upper surface 248 and the lower surface. In the light-emitting device 200 illustrated, the upper surface 248, the lower surface, and the plurality of lateral surfaces are flat surfaces. The upper surface 248 and the lower surface are parallel with each other. Also, the lower surface has a larger area than the upper surface 248. However, the positional relationship and the area size relationship between the upper surface 248 and the lower surface are not limited thereto.

The plurality of lateral surfaces include a second reflective surface 242 that reflects incident light and a third reflective surface 243 that reflects incident light. Furthermore, the plurality of lateral surfaces include two lateral surfaces on either side of the second reflective surface 242 in a top view. The two lateral surfaces on either side of the second reflective surface 242 have different areas.

In the illustrated light-emitting device 200, the upper surface 248 is a right angled triangle, and the second reflective surface 242 and the third reflective surface 243 are rectangles. The upper surface 248 may be an isosceles right triangle. In a top view, one side of the two sides other than the long sides of the upper surface 248, which is roughly a right angled triangle, meets one side of the second reflective surface 242 and has the same length as that side. The side where the upper surface 248 and the second reflective surface 242 meet corresponds to the boundary between the upper surface 248 and the second reflective surface 242. In a top view, the boundary between the upper surface 248 and the second reflective surface 242 is within a region surrounded by the outer periphery of the lower surface and between one side of the lower surface that meets the second reflective surface 242 and the third reflective surface 243.

The second reflective surface 242 is inclined with respect to the lower surface. The inclination angle of the second reflective surface 242 with respect to the lower surface is 45 degrees, for example. The third reflective surface 243 is perpendicular to the lower surface and meets the long side of the upper surface 248. That is, in a top view, the third reflective surface 243 is inclined with respect to a flat surface that is perpendicular to the lower surface and passes through the boundary between the upper surface 248 and the second reflective surface 242. The inclination angle of the third reflective surface 243 with respect to the flat surface that is perpendicular to the lower surface and passes through the boundary between the upper surface 248 and the second reflective surface 242 is 45 degrees, for example.

Note that the upper surface 248, the lower surface, and the plurality of lateral surfaces may be curved surfaces or may be a mixture of flat surfaces and curved surfaces. Also, the second reflective surface 242 and the third reflective surface 243 may be non-rectangular shapes as long as they can reflect incident light in the desired direction. Additionally, in the second reflective member 240B, the portion including the second reflective surface 242 and the portion including the third reflective surface 243 may be integrally formed or may be separate members.

The third reflective member 240C is provided with an upper surface 249, a lower surface, and a plurality of lateral surfaces that meet the upper surface 249 and the lower surface. In the light-emitting device 200 illustrated, the upper surface 249, the lower surface, and the plurality of lateral surfaces are flat surfaces. The upper surface 249 and the lower surface are parallel with each other. The lower surface has an area larger than that of the upper surface 249. However, the positional relationship and the area size relationship between the upper surface 249 and the lower surface are not limited thereto.

The plurality of lateral surfaces include a fourth reflective surface 244 that reflects incident light and a fifth reflective surface 245 that reflects incident light. Furthermore, the plurality of lateral surfaces include two lateral surfaces on either side of the fourth reflective surface 244 in a top view. The two lateral surfaces on either side of the fourth reflective surface 244 have different areas.

In the illustrated light-emitting device 200, the upper surface 249 is a right angled triangle, and the fourth reflective surface 244 and the fifth reflective surface 245 are rectangles. The upper surface 249 may be an isosceles right triangle. In a top view, one side of the two sides other than the long sides of the upper surface 249 meets one side of the fourth reflective surface 244 and as the same length. The side where the upper surface 249 and the fourth reflective surface 244 meet corresponds to the boundary between the upper surface 249 and the fourth reflective surface 244. In a top view, the boundary between the upper surface 249 and the fourth reflective surface 244 is within a region surrounded by the outer periphery of the lower surface and between one side of the lower surface that meets the fourth reflective surface 244 and the fifth reflective surface 245.

The fourth reflective surface 244 is inclined with respect to the lower surface. The inclination angle of the fourth reflective surface 244 with respect to the lower surface is 45 degrees, for example. The fifth reflective surface 245 is perpendicular to the lower surface and meets the long side of the upper surface 249. That is, in a top view, the fifth reflective surface 245 is inclined with respect to a flat surface that is perpendicular to the lower surface and passes through the boundary between the upper surface 249 and the fourth reflective surface 244. The inclination angle of the fifth reflective surface 245 with respect to the flat surface that is perpendicular to the lower surface and passes through the boundary between the upper surface 249 and the fourth reflective surface 244 is 45 degrees, for example.

Note that the upper surface 249, the lower surface, and the plurality of lateral surfaces may be curved surfaces or may be a mixture of flat surfaces and curved surfaces. Also, the fourth reflective surface 244 and the fifth reflective surface 245 may be non-rectangular shapes as long as they can reflect incident light in the desired direction. The third reflective member 240C may have the same shape as the second reflective member 240B. Additionally, in the third reflective member 240C, the portion including the fourth reflective surface 244 and the portion including the fifth reflective surface 245 may be integrally formed or may be separate members.

The fourth reflective member 240D is provided with a lower surface, a sixth reflective surface 246 that reflects incident light, and a plurality of lateral surfaces that meet the sixth reflective surface 246 and the lower surface. In the light-emitting device 200 illustrated, the lower surface, the sixth reflective surface 246, and the plurality of lateral surfaces are flat surfaces.

The plurality of lateral surfaces include two lateral surfaces on either side of the sixth reflective surface 246 in a top view. Also, the plurality of lateral surfaces include one lateral surface that meets with the two lateral surfaces on either side of the sixth reflective surface 246 in a top view. The two lateral surfaces on either side of the sixth reflective surface 246 may have the same area.

In the light-emitting device 200 illustrated, the sixth reflective surface 246 is a rectangle. The sixth reflective surface 246 is inclined with respect to the lower surface. The inclination angle of the sixth reflective surface 246 with respect to the lower surface is 45 degrees, for example.

Note that the lower surface and the sixth reflective surface 246 may be curved surfaces or may be a mixture of flat surfaces and curved surfaces. Also, the sixth reflective surface 246 may be a non-rectangular shape as long as it can reflect incident light in the desired direction.

For the first reflective member 240A, the second reflective members 240B, the third reflective member 240C, and the fourth reflective member 240D, glass, metal, or the like can be used as the main material for forming the external shape. The main material is preferably a heat-resistant material, and, for example, glass such as quartz or BK7 (borosilicate glass), metal such as aluminum, or Si can be used. Also, the first reflective surface 241, the second reflective surface 242, the third reflective surface 243, the fourth reflective surface 244, the fifth reflective surface 245, and the sixth reflective surface 246 can be formed using, for example, metal such as Ag or Al, or a dielectric multilayer film of $Ta_2O_5/SiO_2$, $TiO_2/SiO_2$, or $Nb_2O_5/SiO_2$.

Protecting Element 250

The protecting element 250 is for preventing specific elements such as semiconductor laser elements from being damaged by an excessive current flowing therethrough. For example, a Zener diode formed of Si can be used as the protecting element 250. Also, for example, the protecting element 250 may be a component for measuring the temperature to ensure that a specific element does not fail due to the temperature environment. For example, a thermistor can be used as the temperature measuring element. The temperature measuring element may be disposed at or near the emitting surface of the light-emitting element 220.

Wiring 270

The wiring 270 is formed from a conductor with a linear shape with bonded portions at both ends. In other words, the wiring 270 includes the bonded portions that are bonded to other components, at both ends of the linear portion. The wiring 270 is used for electrical connection between two components. For example, a metal wire can be used as the wiring 270. Examples of the metal include gold, aluminum, silver, copper, and the like.

Light-emitting Device 200

Next, the light-emitting device 200 will be described.

In the example of the light-emitting device 200 described below, each one of the plurality of light-emitting elements 220 is a semiconductor laser element. In the illustrated example, the plurality of light-emitting elements 220 include a first light-emitting element 220A, a second light-emitting element 220B, and a third light-emitting element 220C. However, the light-emitting device 200 may be provided with two light-emitting elements 220 or may be disposed with four or more light-emitting elements 220.

The first light-emitting element 220A, the second light-emitting element 220B, and the third light-emitting element 220C emit a red first light L1, a blue second light L2, and a green third light L3, respectively. The light-emitting device 200 provided with the three light-emitting elements respectively emitting red light, blue light, and green light, for example, can be applied to laser TVs or head mounted displays. However, the color of the light emitted by the plurality of light-emitting elements 220 is not limited thereto, and may be red, blue, green, and/or light of another color, and a light-emitting element emitting any of such colors may be used. Furthermore, depending on the application, a plurality of light-emitting elements that emit light of the same color may be included.

Here, the first light L1, the second light L2, and the third light L3 referred to as the main portion of light in a case in which the first light-emitting element 220A, the second light-emitting element 220B, and the third light-emitting element 220C are semiconductor laser elements.

In the base portion 211, a plurality of the submounts 230 are disposed on upper surface 211a. In the illustrated example, one of the plurality of light-emitting elements 220 is disposed on the upper surface of each submount 230. In other words, the number of submounts 230 disposed on the upper surface 211a is at least equal to the number of light-emitting elements in the light-emitting device 200. In the illustrated example of the light-emitting device 200, three submounts 230 are disposed. However, the plurality of light-emitting elements 220 may be disposed on one submount 230. The lower surface of the submount 230 is joined to the upper surface of the metal film formed in the upper surface 211a of the base portion 211, for example. Note that, in the light-emitting device 200 according to the present embodiment, the submount may be omitted. For example, the plurality of light-emitting elements 220 may be directly disposed on the upper surface 211a of the base portion 211, or protrusion portions may be provided at positions where the plurality of light-emitting elements 220 will be disposed and the plurality of light-emitting elements 220 may be provided on the upper surfaces of the protrusion portions.

In the light-emitting device 200, the plurality of light-emitting elements 220 are disposed above the upper surface 211a of the base portion 211. In the illustrated example of the light-emitting device 200, the first light-emitting element 220A, the second light-emitting element 220B, and the third light-emitting element 220C are spaced apart from one another in the second direction Y with the long side direction aligned with the first direction X in the order of the first light-emitting element 220A, the second light-emitting element 220B, and the third light-emitting element 220C.

Specifically, the light-emitting elements 220 are disposed above the upper surface 211a via the submounts 230. The plurality of light-emitting elements 220 are arranged such that their emitting surfaces face in the same direction in which one of the lateral surfaces of the submounts 230 where the plurality of light-emitting elements 220 are disposed faces. The plurality of light-emitting elements 220 are disposed with their emitting surfaces facing toward the same side. In the illustrated example, a first emitting surface 221, a second emitting surface 222, and a third emitting surface 223 of the first light-emitting element 220A, the second light-emitting element 220B, and the third light-emitting element 220C are all arranged facing the first direction X. The first emitting surface 221, the second emitting surface 222, and the third emitting surface 223 may be disposed on the same plane. Here, in the meaning of being disposed on the same plane, a deviation of ±50 μm in the first direction X is allowed.

From among the light-emitting elements 220, one lateral surface that meets the emitting surface of one light-emitting element is located opposite one lateral surface that meets the emitting surface of another light-emitting element. In the illustrated example, one lateral surface that meets the first emitting surface 221 of the first light-emitting element 220A is located opposite one lateral surface that meets the second emitting surface 222 of the second light-emitting element 220B. Also, another lateral surface that meets the second emitting surface 222 of the second light-emitting element 220B is located opposite one lateral surface that meets the third emitting surface 223 of the third light-emitting element 220C. The two lateral surfaces that meet the first emitting surface 221 of the first light-emitting element 220A, the two lateral surfaces that meet the second emitting surface 222 of the second light-emitting element 220B, and the two lateral surfaces that meet the third emitting surface 223 of the third light-emitting element 220C are parallel with the first direction X in a top view, for example.

Here, in the illustrated example, regarding the wiring region 216 along the two sides extending in the first direction X, the wiring region on the side nearest the first light-emitting element 220A is referred to as a first wiring region 216A and the wiring region on the side nearest the third light-emitting element 220C is referred to as a second wiring region 216B. Also, the wiring region located at the upper surface 214a along one of the sides extending in the second direction Y is referred to as a third wiring region 216C.

The plurality of the wirings 270 that connect to the plurality of light-emitting elements 220 are joined to the plurality of metal films provided in the wiring region 216 of the frame portion 212.

In the example illustrated in FIG. 3, the plurality of wirings 270 that connect to the first light-emitting element 220A are joined to the metal film provided in the first wiring region 216A. The plurality of the wirings 270 that connect to the third light-emitting element 220C are joined to the metal film provided in the second wiring region 216B. The wiring 270 that connects to the second light-emitting element 220B is joined to the metal film provided in the third wiring region 216C. In a similar manner, the wiring 270 that connects to the third light-emitting element 220C is joined to the metal film provided in the third wiring region 216C. In the illustrated example, the wiring 270 that connected to the third light-emitting element 220C is joined to the second wiring region 216B and the third wiring region 216C, but may also be joined to only the second wiring region 216B.

In addition, from among the two sides that extend in the second direction Y, on the side where the light emitted from the plurality of light-emitting elements 220 advances, the wiring region 216 is not provided. The wiring region 216 is preferably disposed such that the wiring 270 does not interfere with the light emitted from the light-emitting elements 220.

The pattern of the wirings illustrated is merely an example, and the wiring region 216 may be provided only along the two sides extending in the first direction X. In this case, the wiring 270 that connects to one of the light-emitting elements 220 is joined to the metal film provided in the first wiring region 216A, and the wiring 270 that connects to another one of the light-emitting elements 220 is joined to the metal film provided in the second wiring region 216B.

Furthermore, in the illustrated example, regarding the plurality of metal films provided in the wiring region 216, in order from the metal films provided in the first wiring region 216A, the third wiring region 216C, and the second wiring region 216B are metal films defined as a first metal film, a second metal film, a third metal film, a fourth metal film, a fifth metal film, and a sixth metal film.

In the upper surface 214a of the stepped portion 214, one or more protecting elements 250 are further disposed. A plurality of protecting elements 250 corresponding to the plurality of light-emitting elements 220 are disposed spanning between two metal films in the upper surface 214a along the two sides extending in the first direction X and along the one side connecting the two sides and extending in the second direction Y.

In the illustrated example, a first protecting element 250A corresponding to the first light-emitting element 220A is disposed spanning between the first metal film and the second metal film. A second protecting element 250B corresponding to the second light-emitting element 220B is disposed spanning between the third metal film and the fourth metal film. A third protecting element 250C corresponding to the third light-emitting element 220C is disposed spanning between the fifth metal film and the sixth metal film. Also, the boundary between the first metal film and the second metal film and the boundary between the fifth metal film and the sixth metal film extend in the direction (second direction) perpendicular to the direction (first direction X) in which the stepped portion extends, and the boundary between the third metal film and the fourth metal film extends in the direction (second direction Y) parallel with the direction (second direction Y) in which the stepped portion extends. The first, second, and third protecting elements 250A, 250B, 250C are disposed spanning across these boundaries.

As described above, by disposing the second protecting element 250B spanning across the boundary extending in the direction parallel with the direction in which the stepped portion extends, the short side direction of the second protecting element 250B is aligned with the extending direction of the stepped portion, increasing the efficienty of the wirings.

In the light-emitting device 200, the one or more reflective members 240 are disposed on the upper surface 211a of the base portion 211. The one or more reflective members 240 include the first reflective surface 241, the second reflective surface 242, and the third reflective surface 243. In the illustrated example, the one or more reflective members 240 further include the fourth reflective surface 244, the fifth reflective surface 245, and the sixth reflective surface 246. In the light-emitting device 200, one reflective member may be provided with the first reflective surface 241, the second reflective surface 242, and the third reflective surface 243, or the first reflective surface 241, the second reflective surface 242, and the third reflective surface 243 may be constituted by a plurality of reflective members. Also, one reflective member may be provided with the fourth reflective surface 244, the fifth reflective surface 245, and the sixth reflective surface 246, or the fourth reflective surface 244, the fifth reflective surface 245, and the sixth reflective surface 246 may be constituted by the plurality of reflective members 240.

Figure 5:
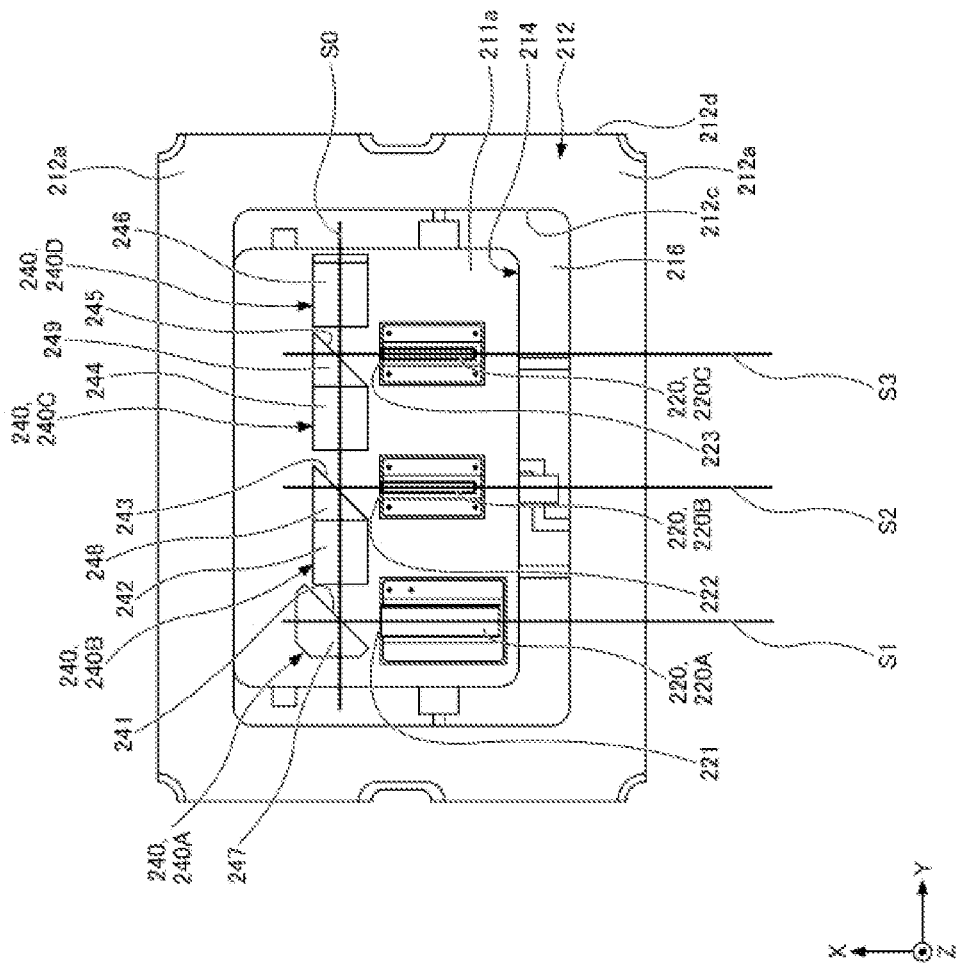
FIG. 5 is a schematic view for describing the positional relationship of reflective surfaces of reflective members.

In the illustrated example of the light-emitting device 200, the mutually independent first reflective member 240A, second reflective member 240B, third reflective member 240C, and the fourth reflective member 240D are disposed on the upper surface 211a of the base portion 211. The first reflective member 240A, the second reflective member 240B, the third reflective member 240C, and the fourth reflective member 240D are disposed in a row in the second direction Y. The first reflective surface 241, the second reflective surface 242, the third reflective surface 243, the fourth reflective surface 244, the fifth reflective surface 245, and the sixth reflective surface 246, for example, as illustrated in FIG. 5, are disposed at positions a straight line S0, which is an imaginary line parallel with the second direction Y, passes through in a top view.

In the illustrated example of the light-emitting device 200, the first reflective member 240A including the first reflective surface 241, the second reflective member 240B including the second reflective surface 242 and the third reflective surface 243, the third reflective member 240C including the fourth reflective surface 244 and the fifth reflective surface 245, and the fourth reflective member 240D including the sixth reflective surface 246 are disposed on the upper surface 211a of the base portion 211. Because the second reflective member 240B is provided with the second reflective surface 242 and the third reflective surface 243, the second reflective surface 242 and the third reflective surface 243 can be disposed close to one another. This allows the size of the light-emitting device 200 in the second direction Y to be reduced. Also, because the third reflective member 240C is provided with the fourth reflective surface 244 and the fifth reflective surface 245, the fourth reflective surface 244 and the fifth reflective surface 245 can be disposed close to one another. This allows the size of the light-emitting device 200 in the second direction Y to be reduced. However, the light-emitting device 200 according to the present embodiment is not limited thereto, and may be, for example, a light-emitting device in which six reflective members each including one reflective surface are separately disposed on the upper surface 211a of the base portion 211.

The first reflective surface 241 faces the first emitting surface 221 of the first light-emitting element 220A. That is, as illustrated in FIG. 5, in a top view, the first reflective surface 241 is disposed at a position where a first straight line S1 passes through, the first straight line S1 being an imaginary line that extends through the first emitting surface 221 of the first light-emitting element 220A and is perpendicular to the first emitting surface 221. In a case in which the light emitted from the first light-emitting element 220A is light that spreads such as that of a semiconductor laser element, by disposing the first reflective surface 241 as described above, an excessive increase in the size of the first reflective surface 241 can be suppressed even in a case in which the first reflective surface 241 is set to be large enough to fully reflect the first light L1, which is a main portion of light. In a top view, the first reflective surface 241 is non-parallel with the first direction X and the second direction Y. That is, in a top view, the first reflective surface 241 is non-parallel with the first emitting surface 221 of the first light-emitting element 220A. In a top view, the first reflective surface 241 is inclined by 45 degrees, for example, with respect to the first emitting surface 221 of the first light-emitting element 220A.

The third reflective surface 243 faces the second emitting surface 222 of the second light-emitting element 220B. That is, as illustrated in FIG. 5, in a top view, the third reflective surface 243 is disposed at a position where a second straight line S2 passes through, the second straight line S2 being an imaginary line that extends through the second emitting surface 222 of the second light-emitting element 220B and is perpendicular to the second emitting surface 222. In a case in which the light emitted from the second light-emitting element 220B is light that spreads such as that of a semiconductor laser element, by disposing the third reflective surface 243 as described above, an excessive increase in the size of the third reflective surface 243 can be suppressed even in a case in which the third reflective surface 243 is set to be large enough to fully reflect the second light L2, which is a main portion of light. In a top view, the third reflective surface 243 is non-parallel with the first direction X and the second direction Y. That is, in a top view, the third reflective surface 243 is non-parallel with the second emitting surface 222 of the second light-emitting element 220B. In a top view, the third reflective surface 243 is inclined by 45 degrees, for example, with respect to the second emitting surface 222 of the second light-emitting element 220B.

The fifth reflective surface 245 faces the third emitting surface 223 of the third light-emitting element 220C. That is, as illustrated in FIG. 5, in a top view, the fifth reflective surface 245 is disposed at a position where a third straight line S3 passes through, the third straight line S3 being an imaginary line that extends through the third emitting surface 223 of the third light-emitting element 220C and is perpendicular to the third emitting surface 223. In a case in which the light emitted from the third light-emitting element 220C is light that spreads such as that of a semiconductor laser element, by disposing the fifth reflective surface 245 as described above, an excessive increase in the size of the fifth reflective surface 245 can be suppressed even in a case in which the fifth reflective surface 245 is set to be large enough to fully reflect the third light L3, which is a main portion of light. In a top view, the fifth reflective surface 245 is non-parallel with the first direction X and the second direction Y. That is, in a top view, the fifth reflective surface 245 is non-parallel with the third emitting surface 223 of the third light-emitting element 220C. In a top view, the fifth reflective surface 245 is inclined by 45 degrees, for example, with respect to the third emitting surface 223 of the third light-emitting element 220C.

In a top view, the second reflective surface 242 is disposed between the first reflective surface 241 and the third reflective surface 243 in the second direction Y. That is, as illustrated in FIG. 5, the second reflective surface 242 is not disposed at a position where the first straight line S1 and the second straight line S2 pass through in a top view. Disposing the second reflective surface 242 in such a manner can suppress the second reflective surface 242 from overlapping of the first light L1 emitted from the first light-emitting element 220A and incident on the first reflective surface 241, and also can suppress from overlapping of the second light L2 emitted from the second light-emitting element 220B and incident on the third reflective surface 243. Furthermore, the second reflective surface 242 is disposed between the first straight line S1 and the second straight line S2 in a top view. Accordingly, the first light L1 reflected upward at the second reflective surface 242 can be brought closer to the second light L2 reflected upward at the fourth reflective surface 244 at the upper surface of the lid member 213.

In a top view, the fourth reflective surface 244 is disposed between the third reflective surface 243 and the fifth reflective surface 245 in the second direction Y. That is, as illustrated in FIG. 5, the fourth reflective surface 244 is not disposed at a position where the second straight line S2 and the third straight line S3 pass through in a top view. Accordingly, the fourth reflective surface 244 can be suppressed from overlapping of the second light L2 emitted from the second light-emitting element 220B and incident on the third reflective surface 243 and can also be suppressed from overlapping the third light L3 emitted from the third light-emitting element 220C and incident on the fifth reflective surface 245. The fourth reflective surface 244 is disposed between the second straight line S2 and the third straight line S3 in a top view. Accordingly, the second light L2 reflected at the third reflective surface 243 and incident on the fourth reflective surface 244 and the third light L3 emitted from the third light-emitting element 220C and incident on the fifth reflective surface 245 can be suppressed from overlapping.

In a top view, the sixth reflective surface 246 is disposed on the opposite side from the fourth reflective surface 244 with respect to the fifth reflective surface 245 in the second direction Y. That is, as illustrated in FIG. 5, the sixth reflective surface 246 is not disposed at a position where the third straight line S3 passes through in a top view. Accordingly, the sixth reflective surface 246 can be suppressed from overlapping the third light L3 emitted from the third light-emitting element 220C and incident on the fifth reflective surface 245. The sixth reflective surface 246 is disposed on the opposite side from the fourth reflective surface 244 with respect to the third straight line S3 in a top view. Accordingly, the third light L3 reflected upward at the sixth reflective surface 246 can be suppressed from overlapping with the second light L2 reflected upward at the fourth reflective surface 244.

The first reflective surface 241, the third reflective surface 243, and the fifth reflective surface 245 may be disposed in parallel with one another or may be disposed not in parallel with one another. The second reflective surface 242, the fourth reflective surface 244, and the sixth reflective surface 246 may be disposed in parallel with one another or may be disposed not in parallel with one another. Any reflective surface selected from the first reflective surface 241, the third reflective surface 243, and the fifth reflective surface 245 and any reflective surface selected from the second reflective surface 242, the fourth reflective surface 244, and the sixth reflective surface 246 are not parallel and not perpendicular. Note that the terms "parallel" and "perpendicular" used here allows a difference of ± 5 degrees.

The lid member 213 is disposed on the upper surface 212a of the frame portion 212. Specifically, the lid member 213 is supported by the upper surface 212a of the frame portion 212 and disposed above the first light-emitting element 220A, the second light-emitting element 220B, and the third light-emitting element 220C and the first reflective member 240A, the second reflective member 240B, the third reflective member 240C, and the fourth reflective member 240D which are surrounded by the frame portion 212. For example, the metal film provided on the outer peripheral portion of the lower surface of the lid member 213 and the metal film provided on the upper surface 212a of the frame portion 212 are joined and fixed together via Au-Sn or the like.

By the lid member 213 being joined to the upper surface 212a of the frame portion 212, a closed space is formed. The first light-emitting element 220A, the second light-emitting element 220B, and the third light-emitting element 220C are disposed in the closed space. This closed space is formed in a hermetically sealed state. By being hermetically sealed, collection of dust such as organic substances on the emitting surfaces of the first light-emitting element 220A, the second light-emitting element 220B, and the third light-emitting element 220C can be suppressed.

Figure 6:
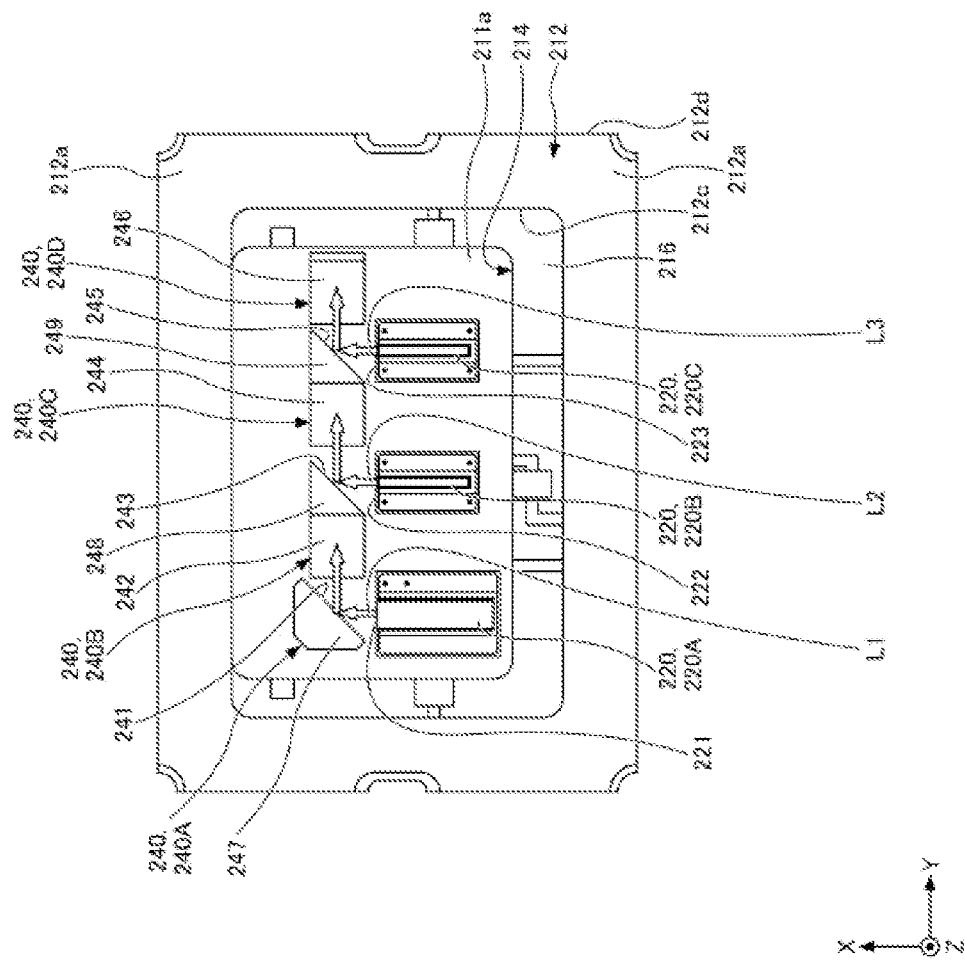
FIG. 6 is a schematic view (1) for describing how light emitted from light-emitting elements travels.
Figure 7:
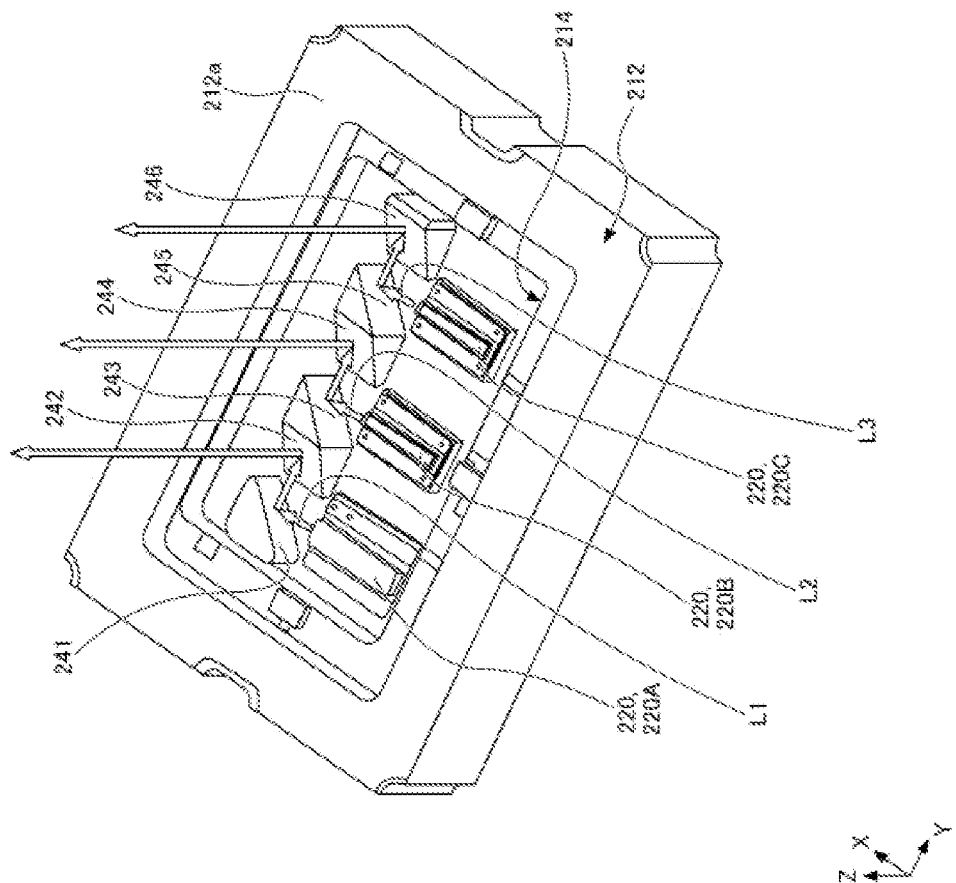
FIG. 7 is a schematic view (2) for describing how light emitted from the light-emitting elements travels.

As illustrated in FIGS. 6 and 7, in the first light-emitting element 220A, the first light L1 emitted from the first emitting surface 221 advances toward the first reflective surface 241. The optical axis of the first light L1 emitted from the first emitting surface 221 is parallel with the upper surface 211a of the base portion 211, for example. The optical axis of the first light L1 emitted from the first emitting surface 221 is aligned with the first straight line S1 illustrated in FIG. 5 in a top view, for example. The first direction X is perpendicular to the first emitting surface 221. The first light L1 that is emitted from the first emitting surface 221 and advances toward the first reflective surface 241 includes light the advances in the first direction X.

The first light L1 emitted to the first reflective surface 241 is reflected at the first reflective surface 241. The first light L1 reflected at the first reflective surface 241 advances toward the second reflective surface 242. The first light L1 that is reflected at the first reflective surface 241 and advances toward the second reflective surface 242 includes light that advances in the second direction Y. The first light L1 emitted to the second reflective surface 242 is reflected upward from the upper surface 211a of the base portion 211 and advances to the lid member 213. The first light L1 that is reflected at the second reflective surface 242 and advances toward the lid member 213 includes light that advances in the third direction Z. The optical axis of the first light L1 that is reflected at the second reflective surface 242 and advances toward the lid member 213 can be set perpendicular to the upper surface 211a of the base portion 211, for example. Note that the incline of the second reflective surface 242 with respect to the upper surface 211a of the base portion 211 may be adjusted so that the angle of the optical axis of the first light L1 is inclined with respect to the upper surface 211a of the base portion 211.

Also, in the second light-emitting element 220B, the second light L2 emitted from the second emitting surface 222 advances toward the third reflective surface 243. The optical axis of the second light L2 emitted from the second emitting surface 222 is parallel with the upper surface 211a of the base portion 211, for example. The optical axis of the second light L2 emitted from the second emitting surface 222 is aligned with the second straight line S2 illustrated in FIG. 5 in a top view, for example. The second emitting surface 222 is perpendicular to the first direction X, for example. The second light L2 that is emitted from the second emitting surface 222 and advances toward the third reflective surface 243 includes light the advances in the first direction X.

The second light L2 emitted to the third reflective surface 243 is reflected at the third reflective surface 243. The second light L2 reflected at the third reflective surface 243 advances toward the fourth reflective surface 244. The second light L2 that is reflected at the third reflective surface 243 and advances toward the fourth reflective surface 244 includes light that advances in the second direction Y. The second light L2 emitted to the fourth reflective surface 244 is reflected upward from the upper surface 211a of the base portion 211 and advances to the lid member 213. The second light L2 that is reflected at the fourth reflective surface 244 and advances toward the lid member 213 includes light that advances in the third direction Z. The optical axis of the second light L2 that is reflected at the fourth reflective surface 244 and advances toward the lid member 213 can be set perpendicular to the upper surface 211a of the base portion 211, for example. Note that the incline of the fourth reflective surface 244 with respect to the upper surface 211a of the base portion 211 may be adjusted so that the optical axis of the second light L2 is inclined with respect to the upper surface 211a of the base portion 211.

Also, in the third light-emitting element 220C, the third light L3 emitted from the third emitting surface 223 advances toward the fifth reflective surface 245. The optical axis of the third light L3 emitted from the third emitting surface 223 is, for example, parallel to the upper surface 211a of the base portion 211. The optical axis of the third light L3 emitted from the third emitting surface 223 is aligned with the third straight line S3 illustrated in FIG. 5 in a top view, for example. The third emitting surface 223 is perpendicular to the first direction X, for example. The third light L3 that is emitted from the third emitting surface 223 and advances toward the fifth reflective surface 245 includes light the advances in the first direction X.

The third light L3 emitted to the fifth reflective surface 245 is reflected at the fifth reflective surface 245. The third light L3 reflected at the fifth reflective surface 245 advances toward the sixth reflective surface 246. The third light L3 that is reflected at the fifth reflective surface 245 and advances toward the sixth reflective surface 246 includes light that advances in the second direction Y. The third light L3 emitted to the sixth reflective surface 246 is reflected upward from the upper surface 211a of the base portion 211 and advances to the lid member 213. The third light L3 that is reflected at the sixth reflective surface 246 and advances toward the lid member 213 includes light that advances in the third direction Z. The optical axis of the third light L3 that is reflected at the sixth reflective surface 246 and advances toward the lid member 213 can be set perpendicular to the upper surface 211a of the base portion 211, for example. Note that the incline of the sixth reflective surface 246 with respect to the upper surface 211a of the base portion 211 may be adjusted so that the optical axis of the third light L3 is inclined with respect to the upper surface 211a of the base portion 211.

In a top view, the light advancing along the optical axis of the first light L1 that is emitted from the first emitting surface 221 and incident on the first reflective surface 241, the light advancing along the optical axis of the second light L2 that is emitted from the second emitting surface 222 and incident on the third reflective surface 243, and the light advancing along the optical axis of the third light L3 that is emitted from the third emitting surface 223 and incident on the fifth reflective surface 245 are parallel with one another, for example. In a top view, the light advancing along the optical axis of the first light L1 that has been reflected at the first reflective surface 241 and is incident on the second reflective surface 242, the light advancing along the optical axis of the second light L2 that has been reflected at the third reflective surface 243 and is incident on the fourth reflective surface 244, and the light advancing along the optical axis of the third light L3 that has been reflected at the fifth reflective surface 245 and is incident on the sixth reflective surface 246 are parallel with one another, for example. Also, in the illustrated example, in a top view, the light advancing along the optical axis of the first light L1 that has been reflected at the first reflective surface 241 and is incident on the second reflective surface 242, the light advancing along the optical axis of the second light L2 that has been reflected at the third reflective surface 243 and is incident on the fourth reflective surface 244, and the light advancing along the optical axis of the third light L3 that has been reflected at the fifth reflective surface 245 and is incident on the sixth reflective surface 246 advance along the same straight line parallel with the second direction Y.

The optical path length of the light that advances along the optical axis of the first light L1 emitted from the first emitting surface 221 to the second reflective surface 242, the optical path length of the light that advances along the optical axis of the second light L2 emitted from the second emitting surface 222 to the fourth reflective surface 244, and the optical path length of the light that advances along the optical axis of the third light L3 emitted from the third emitting surface 223 to the sixth reflective surface 246 are equal, for example.

Figure 8:
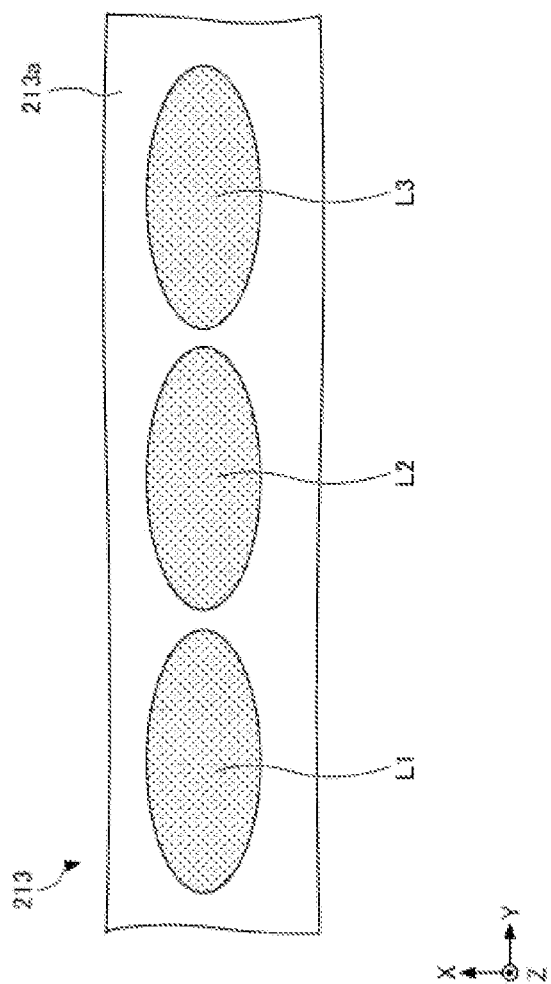
FIG. 8 is a schematic diagram illustrating light emitted to the outside from an upper surface of the lid member.

FIG. 8 is a schematic diagram illustrating light emitted to the outside from the upper surface 213a of the lid member 213. FIG. 8 illustrates the shape of the passage region, in the upper surface 213a of the lid member 213, of the first light L1, the second light L2, and the third light L3 that pass through the upper surface 213a of the lid member 213. In the present specification, the upper surface 213a of the lid member 213 is defined as a light-transmitting surface which the first light L1, the second light L2, and the third light L3 passes through after being reflected upward by the second reflective member 240B, the third reflective member 240C, and the fourth reflective member 240D.

As illustrated in FIG. 8, the first light L1 at the upper surface 213a of the lid member 213 is shorter in length in the first direction X than in the second direction Y. As such an example, the first light L1 has an elliptical shape, for example.

In the first light L1 that is emitted from the first emitting surface 221 of the first light-emitting element 220A and advances toward the first reflective surface 241, the direction (fast axis direction) passing through the major axis of the elliptical shape is aligned with the third direction Z, and the direction (slow axis direction) passing through the minor axis is aligned with the second direction Y. In other words, the first light L1 that is emitted from the first emitting surface 221 of the first light-emitting element 220A and advances toward the first reflective surface 241 is shorter in terms of length in the second direction Y than in the third direction Z. On the other hand, when the first light L1 is reflected approximately 90 degrees at the first reflective surface 241, the elliptical shape of the first light L1 is rotated approximately 90 degrees about an axis aligned with the third direction Z. Thus, for the first light L1 that is reflected at the first reflective surface 241 and advances toward the second reflective surface 242, the direction (slow axis direction) passing through the minor axis is aligned with the first direction X, and the length in the first direction X is less than the length in the third direction Z. Also, when the first light L1 is reflected approximately 90 degrees at the second reflective surface 242, the elliptical shape of the first light L1 is rotated approximately 90 degrees about an axis aligned with the first direction X. In such a case, for the first light L1 at the upper surface 213a of the lid member 213, the direction (fast axis direction) passing through the major axis of the elliptical shape is aligned with the second direction Y, and the length in the first direction X is less than the length in the second direction Y.

As illustrated in FIG. 8, the second light L2 at the upper surface 213a of the lid member 213 is shorter in length in the first direction X than in the second direction Y. As such an example, the second light L2 has an elliptical shape, for example.

For the second light L2 that is emitted from the second emitting surface 222 of the second light-emitting element 220B and advances toward the third reflective surface 243, the direction (fast axis direction) passing through the major axis of the elliptical shape is aligned with the third direction Z, and the direction (slow axis direction) passing through the minor axis is aligned with the second direction Y. In other words, the second light L2 that is emitted from the second emitting surface 222 of the second light-emitting element 220B and advances toward the third reflective surface 243 is shorter in terms of length in the second direction Y than in the third direction Z. On the other hand, when the second light L2 is reflected approximately 90 degrees at the third reflective surface 243, the elliptical shape of the second light L2 is rotated approximately 90 degrees about an axis aligned with the third direction Z. Thus, for the second light L2 that is reflected at the third reflective surface 243 and advances toward the fourth reflective surface 244, the direction (slow axis direction) passing through the minor axis is aligned with the first direction X, and the length in the first direction X is less than the length in the third direction Z. Also, when the second light L2 is reflected approximately 90 degrees at the fourth reflective surface 244, the elliptical shape of the second light L2 is rotated approximately 90 degrees about an axis aligned with the first direction X. At this time, for the second light L2 at the upper surface 213a of the lid member 213, the direction (fast axis direction) passing through the major axis of the elliptical shape is aligned with the second direction Y, and the length in the first direction X is less than the length in the second direction Y.

As illustrated in FIG. 8, the third light L3 at the upper surface 213a of the lid member 213 is shorter in length in the first direction X than in the second direction Y. As such an example, the third light L3 has an elliptical shape, for example.

For the third light L3 that is emitted from the third emitting surface 223 of the third light-emitting element 220C and advances toward the fifth reflective surface 245, the direction (fast axis direction) passing through the major axis of the elliptical shape is aligned with the third direction Z, and the direction (slow axis direction) passing through the minor axis is aligned with the second direction Y. In other words, the third light L3 that is emitted from the third emitting surface 223 of the third light-emitting element 220C and advances toward the fifth reflective surface 245 is shorter in terms of length in the second direction Y than in the third direction Z. On the other hand, when the third light L3 is reflected approximately 90 degrees at the fifth reflective surface 245, the elliptical shape of the third light L3 is rotated approximately 90 degrees about an axis aligned with the third direction Z. Thus, for the third light L3 that is reflected at the fifth reflective surface 245 and advances toward the sixth reflective surface 246, the direction (slow axis direction) passing through the minor axis is aligned with the first direction X, and the length in the first direction X is less than the length in the third direction Z. Also, when the third light L3 is reflected approximately 90 degrees at the sixth reflective surface 246, the elliptical shape of the third light L3 is rotated approximately 90 degrees about an axis aligned with the first direction X. At this time, for the third light L3 at the upper surface 213a of the lid member 213, the direction (fast axis direction) passing through the major axis of the elliptical shape is aligned with the second direction Y, and the length in the first direction X is less than the length in the second direction Y.

At the upper surface 213a of the lid member 213, the light emitted from the plurality of light-emitting elements 220 is located side by side in a straight line in the second direction Y, for example. In other words, the first light L1, the second light L2, and the third light L3 are aligned on a single straight line with the directions (fast axis direction) passing through the major axes of the elliptical shapes being aligned with the second direction Y. Thus, for example, in a case in which the light emitted from the light-emitting device 200 is incident on another member, the incident region of the other member can be given a shorter length in the first direction X. Examples of other members include a light guide plate and the like.

Here, "aligned on a single straight line" refers to in a lateral side view from the second direction Y, the distance in the first direction X from one end of the light of the plurality of light-emitting elements 220 to the other end of light which is the furthest from the one end does not exceed the sum of the lengths of the minor axis (slow axis) of the elliptical shapes of the light of the light-emitting elements 220. In the example illustrated in FIG. 8, the first light L1, the second light L2, and the third light L3 are aligned in a straight line in the second direction Y, for example. In other words, for example, the first light L1, the second light L2, and the third light L3 are aligned on a single straight line with the directions (fast axis direction) passing through the major axes of the elliptical shapes being aligned with the second direction Y.

At the upper surface 213a of the lid member 213, the first light L1, the second light L2, and the third light L3 do not overlap one another. At the upper surface 213a of the lid member 213, the length of each light in the first direction X (slow axis direction) can be in a range from 0.4 mm to 1 mm, for example. Furthermore, the length of each light in the second direction Y (fast axis direction) can be in a range from approximately 2 to 3 times the length in the first direction X (slow axis direction), for example.

In this manner, in the light-emitting device 200, the light emitted from each of the emitting surfaces of the plurality of light-emitting elements is reflected upward by one or more reflective members. As a result, the light-emitting device 200 can be reduced in size.

Light-emitting Module

Figure 9:
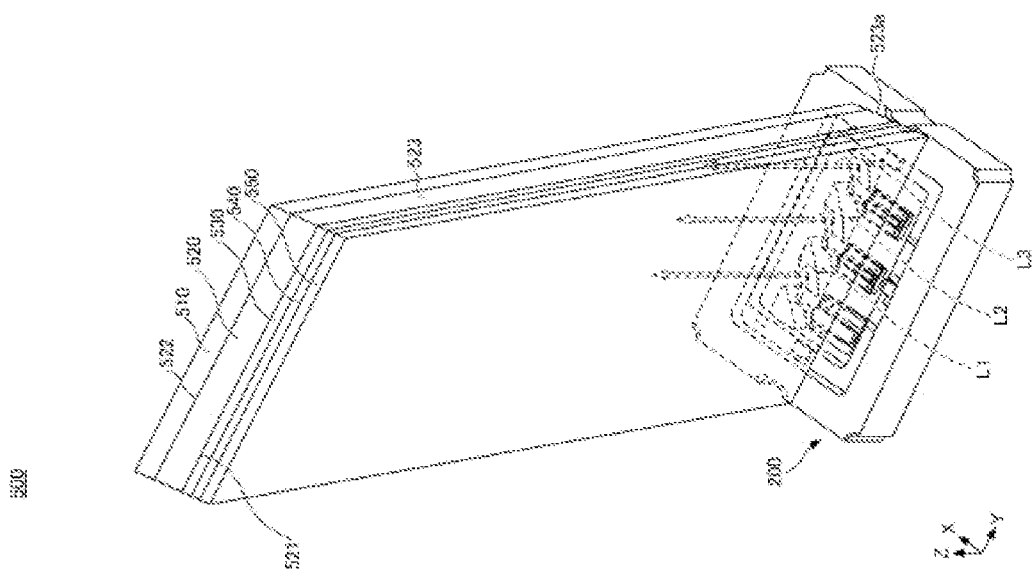
FIG. 9 is a schematic perspective view (1) illustrating a light-emitting module provided with the light-emitting device.
Figure 10:
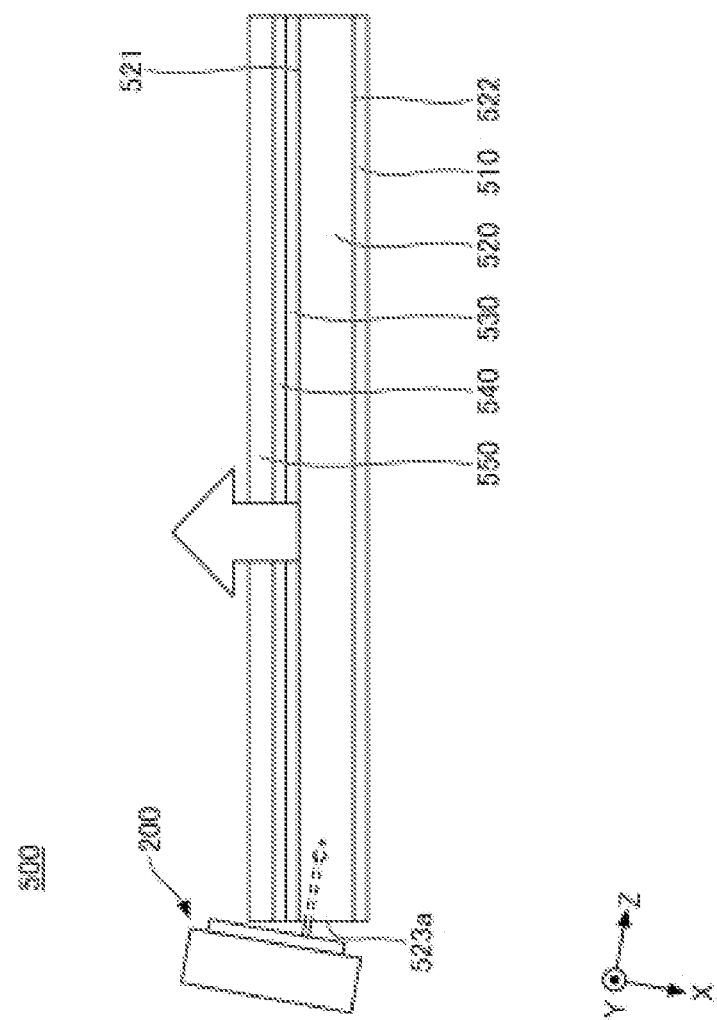
FIG. 10 is a schematic lateral side view (1) illustrating the light-emitting module provided with the light-emitting device.

FIG. 9 is a schematic perspective view (1) illustrating a light-emitting module provided with the light-emitting device 200. FIG. 10 is a schematic lateral side view (1) illustrating a light-emitting module provided with the light-emitting device 200. As illustrated in FIGS. 9 and 10, a light-emitting module 500 includes the light-emitting device 200 and a light guide plate 520 disposed above the light-emitting device 200. The light-emitting module 500 may further be provided with, as necessary, one or more of a reflector 510, a diffusion sheet 530, a prism sheet 540, or a polarizing plate 550. In the example described below, the light-emitting module 500 is provided with the light-emitting device 200 and the light guide plate 520 as well as all of the reflector 510, the diffusion sheet 530, the prism sheet 540, and the polarizing plate 550.

The polarizing plate 550, the prism sheet 540, the diffusion sheet 530, the light guide plate 520, and the reflector 510 are layered in this order in the first direction X. Light emitted from the light-emitting device 200 exits to the light guide plate 520. In other words, the light guide plate 520 is disposed at a position where the first light L1, the second light L2, and the third light L3 emitted from the lid member 213 of the light-emitting device 200 enters the light guide plate 520. The light guide plate 520 is a member for emitting, from the surface, the first light L1, the second light L2, and the third light L3 emitted from the light-emitting device 200.

The light guide plate 520 at least includes a light extraction surface 521, a light reflective surface 522, and a plurality of lateral surfaces 523 for joining these surfaces. Also, among the plurality of lateral surfaces 523, the lateral surface facing the light-emitting device 200 corresponds to a light incident surface 523a. That is, the first light L1, the second light L2, and the third light L3 emitted from the light-emitting device 200 enter the light guide plate 520 from the light incident surface 523a.

At least a portion of the light emitted from the light-emitting device 200 and incident on the light guide plate 520 travels toward the light reflective surface 522 of the light guide plate 520. The light reflective surface 522 of the light guide plate 520 may have protrusions and recessions. Accordingly, the light that travels toward the light reflective surface 522 of the light guide plate 520 may be reflected toward the light extraction surface 521 and extracted. Note that in FIG. 10, an arrow indicated by a solid line indicates the direction of the light emitted from the light-emitting module 500.

The optical axis of the first light L1, the second light L2, and the third light L3 emitted from the light-emitting device 200 and the light reflective surface 522 of the light guide plate 520 are preferably not parallel. As in the example illustrated in FIGS. 9 and 10, the light guide plate 520 is preferably inclined so that the upper surface 213a of the lid member 213 of the light-emitting device 200 and the light reflective surface 522 of the light guide plate 520 are inclined with respect to one another.

Figure 11:
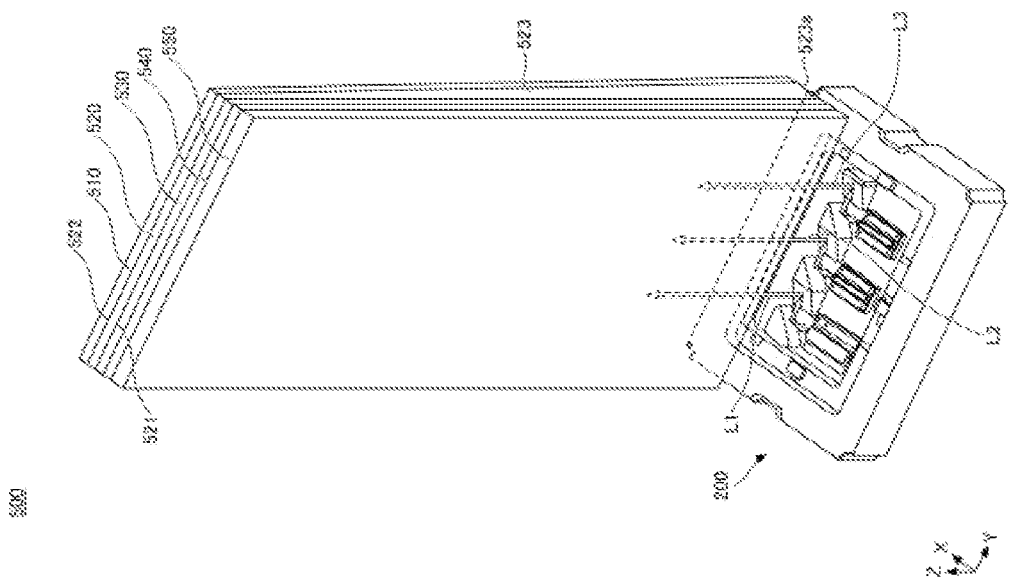
FIG. 11 is a schematic perspective view (2) illustrating a light-emitting module provided with the light-emitting device.

FIG. 11 is a schematic perspective view (2) illustrating a light-emitting module provided with the light-emitting device 200. FIG. 12 is a schematic lateral side view (2) illustrating a light-emitting module provided with the light-emitting device 200. As in the example illustrated in FIGS. 11 and 12, the upper surface 213a of the lid member 213 of the light-emitting device 200 and the light incident surface 523a of the light guide plate 520 may be perpendicular to one another, and the light reflective surface 522 may be inclined so that the angle formed by the light reflective surface 522 and the light incident surface 523a is an acute angle.

The angle formed by the optical axes of each light emitted from the light-emitting device 200 and the light reflective surface 522 of the light guide plate 520 is preferably in a range from 5 degrees to 30 degrees and more preferably in a range from 10 degrees and 15 degrees. This facilitates irradiating the entire light reflective surface 522 of the light guide plate 520 with each light emitted from the light-emitting device 200.

The reflector 510 is disposed on the light reflective surface 522 side of the light guide plate 520 and is a member for reflecting toward the light guide plate 520, the light (leaked light) from the light reflective surface 522 of the light guide plate 520 to the other side. In this manner, light can be efficiently extracted from the light extraction surface 521.

The diffusion sheet 530 is disposed on the light extraction surface 521 side of the light guide plate 520 and is a member for diffusing the light emitted from the light guide plate 520. Even in a case in which the directionality of the light from the light-emitting device 200 is strong, providing the diffusion sheet 530 allows the light guided by the light guide plate 520 to be surface-emitted from the light extraction surface 521 more evenly.

Furthermore, the prism sheet 540 for focusing the light from the diffusion sheet 530 to the side and the polarizing plate 550 that selectively allows only a desire polarized light component to pass through can be provided on the opposite side of the diffusion sheet 530 to the light guide plate 520.

As illustrated in FIG. 8, at the upper surface 213a of the lid member 213 of the light-emitting device 200, the first light L1, the second light L2, and the third light L3 are aligned on a single straight line with the directions (fast axis direction) passing through the major axes of the elliptical shapes being aligned with the second direction Y. In this manner, because the length of the first light L1, the second light L2, and the third light L3 in the first direction X is decreased, the thickness of the light guide plate 520 can be reduced. That is, because the thickness of the light guide plate 520 should only be slightly thicker than the length of each light in the slow axis direction, the thickness of the light guide plate 520 can be reduced. As a result, the light-emitting module 500 can be made thinner and smaller in size.

The light-emitting module 500 can be utilized as a backlight source, for example. The light-emitting module 500 may be utilized not only as a backlight source, but in all devices, such as optical disks, optical communication systems, projectors, displays, printers, measurement instruments, and the like.

Although the preferred embodiments and the like have been described in detail above, the invention is not limited to the above-described embodiments and the like, various modifications and substitutions can be made to the above-described embodiments and the like without departing from the scope of the claims.

What is claimed is:

1. A light-emitting device, comprising:
a base portion;
a plurality of light-emitting elements disposed on an upper surface of the base portion, the plurality of light-emitting elements including:
a first light-emitting element configured to emit first light from a first emitting surface, and
a second light-emitting element configured to emit second light from a second emitting surface; and
one or more reflective members disposed on the upper surface of the base portion and configured to reflect upward the first light and the second light; wherein:
the one or more reflective members include:
a first reflective surface configured to reflect the first light,
a second reflective surface configured to reflect upward the first light that has been reflected at the first reflective surface, and
a third reflective surface configured to reflect the second light;
the first light that is emitted from the first emitting surface and advances toward the first reflective surface includes light that advances in a first direction parallel with the upper surface of the base portion; and
the first light that is reflected at the first reflective surface and advances toward the second reflective surface includes light that advances in a second direction parallel with the upper surface of the base portion and perpendicular to the first direction.

2. The light-emitting device according to claim 1, wherein: the first direction is perpendicular to the first emitting surface.

3. The light-emitting device according to claim 1, wherein:
in a top view, the first reflective surface is disposed at a position through which a first straight line passes, the first straight line being an imaginary line that extends through the first emitting surface and is perpendicular to the first emitting surface; and
in a top view, the second reflective surface is not disposed at a position through which the first straight line passes.

4. The light-emitting device according to claim 3, wherein:
in the top view, the second reflective surface is disposed between the first straight line and a second straight line, the second straight line being an imaginary line that extends through the second emitting surface and is perpendicular to the second emitting surface.

5. The light-emitting device according to claim 1, wherein: the one or more reflective members include a first reflective member that includes the second reflective surface and the third reflective surface.

6. The light-emitting device according to claim 1, further comprising:
a frame portion including an inner lateral surface that surrounds at least a portion of the upper surface of the base portion and extends upward further than the upper surface; wherein:
the frame portion includes a wiring region along two sides extending in the first direction, the wiring region being a region where a plurality of wirings connected to the plurality of light-emitting elements are joined.

7. The light-emitting device according to claim 6, wherein:
the frame portion further includes one or more stepped portions connected along the two sides; and
an upper surface of the one or more stepped portions includes the wiring region.

8. The light-emitting device according to claim 1, wherein:
the one or more reflective members include a fourth reflective surface that reflects upward light that has been reflected at the third reflective surface;
the second light that is emitted from the second emitting surface and advances toward the third reflective surface includes light that advances in the first direction; and
the second light that is reflected at the third reflective surface and advances toward the fourth reflective surface includes light that advances in the second direction.

9. The light-emitting device according to claim 8, further comprising:
a lid member disposed above the plurality of light-emitting elements and the one or more plurality of reflective members; wherein:
the lid member includes a light-transmitting surface through which the first light and the second light reflected upward by the one or more reflective members pass; and
at the light-transmitting surface, a length of the first light in the first direction is less than a length of the first light in the second direction.

10. The light-emitting device according to claim 9, wherein:
the first light that is emitted from the first emitting surface and advances toward the first reflective surface is shorter in length in the second direction than in a direction perpendicular to the upper surface of the base portion.

11. The light-emitting device according to claim 9, wherein:
at the light-transmitting surface, a length of the second light in the first direction is less than a length of the second light in the second direction; and
at the light-transmitting surface, the first light and the second light are aligned in a straight line in the second direction.

12. The light-emitting device according to claim 1, wherein:
the plurality of light-emitting elements further include a third light-emitting element configured to emit a third light from a third emitting surface.

13. The light-emitting device according to claim 12, wherein:
the first light-emitting element, the second light-emitting element, and the third light-emitting element are configured to emit red light, blue light, and green light, respectively.

14. The light-emitting device according to claim 1, wherein:
the plurality of light-emitting elements are semiconductor laser elements.

15. A light-emitting module, comprising:
the light-emitting device according to claim 1; and
a light guide plate disposed above the light-emitting device; wherein:

light emitted from the light-emitting device is emitted to the light guide plate.

\* \* \* \* \*